United States Patent

Lecroy

[11] 3,897,151
[45] July 29, 1975

[54] LASER MISS DISTANCE INDICATOR

[76] Inventor: James F. Lecroy, 6406 Charnwood St., Springfield, Va. 22152

[22] Filed: Jan. 29, 1973

[21] Appl. No.: 329,261

[52] U.S. Cl. .............. 356/5; 356/141; 340/258 B; 250/222
[51] Int. Cl.² ........................................ G01C 3/08
[58] Field of Search .................. 356/4, 5, 141, 152; 250/222, 224; 340/258 B; 343/12 MD; 89/41 L

[56] References Cited
UNITED STATES PATENTS

| | | | |
|---|---|---|---|
| 3,203,305 | 8/1965 | Fairbanks | 356/4 |
| 3,484,167 | 12/1969 | Burns, Jr. | 356/5 |
| 3,781,111 | 12/1973 | Fletcher et al. | 356/152 |
| 3,788,748 | 1/1974 | Knight et al. | 356/141 |

*Primary Examiner*—Malcolm F. Hubler
*Assistant Examiner*—S. C. Buczinski
*Attorney, Agent, or Firm*—R. S. Sciascia; P. Schneider

[57] ABSTRACT

The laser miss distance indicator is an electro-optical device which utilizes a light emitting diode and an electro-optical scanning system to radiate a hemispherically shaped pattern of electromagnetic (light) energy about a target in which the device is installed. When a missile penetrates the radiation envelope, energy is reflected from the surface of the missile. The reflected energy is received by the miss distance indicator through the means of a detector. The detector converts the reflected light energy into an electrical signal which is amplified and processed to extract miss distance and vector information. The information is transmitted to a ground receiving station where a computer processes the data to produce missile miss distance and flight trajectory information.

10 Claims, 7 Drawing Figures

LASER MISS DISTANCE INDICATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to the field of miss distance indicators and more particularly to non-cooperative miss distance indicators utilizing returned electromagnetic energy pulses to determine the miss distance of a missile fired at an airborne target.

Present miss distance scoring devices utilized for airborne scoring of missile intercept problems consist of both cooperative and noncooperative types. The BIDOPS 800B, manufactured by the Babcock Company, is a non-cooperative acoustical device which utilizes the doppler shift to measure miss distance. The AN/DRQ-3, AN/DRQ-3A and the AN/DRQ-4 miss distance indicators are cooperative devices which require an RF transmitter in the missile, an RF receiver and transmitter in the target, and a ground station to process the data. The requirement for attaching a transmitter to the missile under test restricts the variety of missiles with which this system may be used. Other types of current miss distance indicators in use are either radioactive, static charge, magnetic or photographic in nature. They are generally laboratory type devices which require special installation and handling precautions.

Inherent in all of the MDI (Miss Distance Indicator) systems in use today is the fact that their useful range is limited to approximately 50 feet and are not accurate to less than 10 feet. In addition, except for the laboratory type devices, it is impossible to obtain missile vector information.

SUMMARY OF THE INVENTION

The miss distance indicator of the present invention utilizes a laser transmitting and receiving system installed in an airborne target. The transmitting section includes a light emitting diode which is excited by a timed pulser. The emitted light is scanned by an optical system to form an envelope, preferably hemispherical of radiation around the target. When a missile penetrates the radiation envelope, energy is reflected from the surface of the missile. The receiving section receives the reflected energy and converts it into an electrical signal which is amplified and processed to extract missile information. If only distance information is desired, the receiving section has one or more conventional light sensitive elements, such as silicon PIN detectors. The time lag between a transmitted pulse and its received echo indicates the distance between the target and missile at a given time. A plurality of distance measurements are made while the missile is within the radiation envelope. As distance points are generated, a computer resolves the points in a manner well known to those in the art into a mathematical curve which is differentiated to find the minima. The minima is the miss distance.

If missile vector information is also desired, the receiver uses a position sensing detector, such as a strip detector, in place of the conventional diode detector. The strip detector provides elevation information while azimuth information can be derived from the scanning system. This permits a determination of the missile vector information (missile speed and direction) while the missile is within the radiation envelope.

The laser MDI can successfully reach out much further than the best of the systems today and provide much greater accuracy. In addition, the laser MDI can provide full missile vector information and is completely non-cooperative. Not only can the laser MDI out perform all other existing MDI units, but it can favorably compete on a cost per unit basis, in most cases costing far less.

OBJECTS OF THE INVENTION

An object of the present invention is to indicate the distance by which a missile misses an airborne target with a high degree of accuracy.

Another object of the invention is to provide a miss distance indicator which measures the speed and travel direction of a missile relative to the target.

A further object of the invention is to provide a miss distance indicator which uses an optically scanned low power laser device to generate a hemispherically shaped envelope of radiation around the target.

Other objects, advantages and novel features of the present invention will become apparent from the following detailed description of the invention when considered in conjunction with the accompanying drawings.

DESCRIPTION OF THE PREFERRED EMBODIMENT

Figure 1:
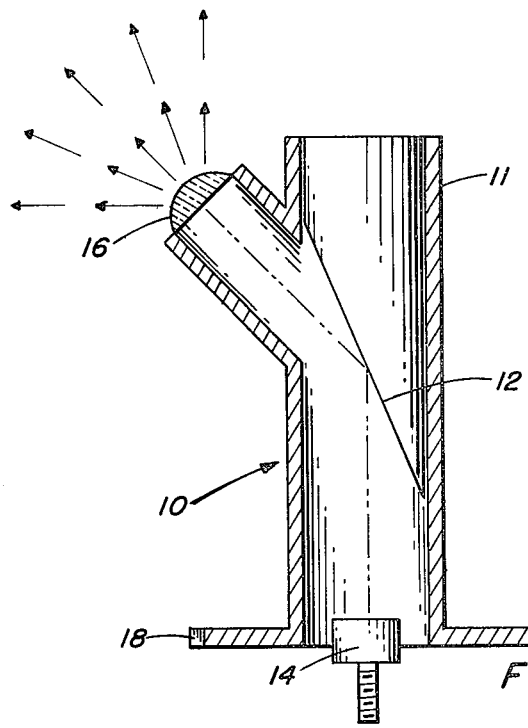
FIG. 1 shows one embodiment of the scanning system of the invention.

Referring to FIG. 1, 10 represents a diagonal mirror scanning system for providing a hemispherically shaped radiation envelope. A laser source 14, such as a GaAs diode having a beamwidth of 3 milliradians, is mounted at one end of tube 11. The light emitting section of the diode faces toward the interior of the tube. The diode is mounted so that the emitted beam is co-axial with the tube 11. A plane mirror 12 is mounted within the tube near the end opposite the diode. Mirror 12 lies at an angle of 22.5° to the axis of the tube and light beam. The light beam is reflected from the mirror at an angle of 45° from the axis of the tube. The reflected light beam is passed through a single axis wide angle cylindrical lens 16 which spreads the beam vertically to form an energy wedge 90° by 3 milliradians. The entire structure is then rotated a full 360° so that a radiation envelope covering the entire upper hemisphere is created. Gear teeth 18 are provided to couple the structure to a motor to provide rotation.

Figure 2:
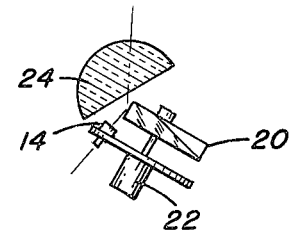
FIG. 2 shows another embodiment of the scanning system of the invention.

FIG. 2 shows another scanning system for providing the hemispherical envelope of radiation. The same numbers are used to designate common elements in all the figures. The 3 milliradian beam of light is provided by laser diode 14. A rotating disc 20 driven by motor 22 is placed in front of the diode. The edge of the disc is tapered from 10° to 90° around the circumference with respect to the axis of the disc. The tapered edge of the disc is reflective and constitutes the scanning mirror. The laser diode 14 is disposed at an angle of 10° to the axis of the disc. Therefore, when the edge of the disc nearest the laser beam is the 10° taper point, the laser beam is parallel to the edge and just clears the reflecting surface. As the mirror rotates, the beam strikes the mirror surface and is reflected. The light beam is reflected at an angle from the face of the mirror equal to the angle the beam makes with the mirror face when striking it. When the mirror face near the beam is at the 90° position, the angle between the beam and the mirror face is 80°. The angle of the reflected beam from the axis of the disc is 160°. The reflected beam, therefore, sweeps through an arc from 10° to 160° and then back to the 10° position with each revolution of the disc. The beam passes through diverging lens 24 to scan a wedge of light energy 3 milliradian by 180° over a 160° sector.

The miss distance is determined by taking a plurality of distance measurements to generate distance points while the missile is within the radiation envelope, resolving these points into a curve and finding the minima of the curve. Therefore, the scanning system must be capable of scanning fast enough to allow at least three distance points to be generated while the missile is within the predetermined range of the miss distance indicator. The required scanning speed can be calculated as follows.

Although three points will define a curve, for increased accuracy at least five points are assumed to be the minimum required. A range of 200 feet is assumed. The necessary scanning speed is a function of the relative velocity between the missile and target; therefore, a head-on intercept is assumed. Since a miss distance indicator is most often used for scoring surface-to-air missile shots, a missile velocity of mach 1.8, which is typical of present missiles used in this manner, is assumed. The highest velocity target in the foreseeable future is the HAST (High Altitude Supersonic Target) having a velocity of 4.0 mach at 90,000 feet. Relative velocity is, then, 5.8 mach, or 5710 ft/sec. At that velocity, it takes 0.035 seconds to travel 200 feet. To generate five distance points, there must be an echo every 0.007 seconds. Therefore $1/0.007$, or 142.8 scans per second is the required scanning speed of the system for this example.

The gallium arsenide light emitting diode can be pulsed from 500 Hz to 50,000 Hz, depending on the type of pulse generator and voltage supply provided and whether or not the diode is cryogenically cooled. Cryogenically cooling a light emitting laser diode permits high pulse repetition rates. The higher the pulse repetition rate, the closer together the pulses of energy will be as the beam is scanned through the sector. The closer together the pulses of energy are, the more frequent the missile position will be sampled providing a greater number of distance and vector solutions. Continuous sampling is ideal and provides the greatest accuracy. A pulsed laser beam will not provide continuous sampling but the higher the repetition rate, the closer the result will be to a continuous sampling.

A number of cooling systems are available on the market today, such as Thermo Electric, Freon, Carbon Dioxide and Liquid Nitrogen, which are sufficiently compact to permit high repetition rates without adversely affecting the size and weight limitations of the MDI unit. Such coolants as Freon, Carbon Dioxide and Liquid Nitrogen, could be provided from a remote canister which could be located in a convenient area of the target vehicle and the coolant piped to the diode.

Missile reflectivity may be enhanced by the addition of a reasonable amount of reflective material to the exterior surface of the missile. This can be accomplished by spraying the surface of the missile with a highly reflective paint; or a material, such as Scotchlite reflective tape, can be added. This can easily be done by fleet personnel in preparation for a scoring mission and will not affect the performance characteristics of the missile. Furthermore, present day production practice is to use a material similar to Scotchlite tape for the construction of decals to be used for missile markings rather than actually painting the markings on the missile. These decals hold up well in service and retain their reflective characteristics indefinately.

Figure 3:
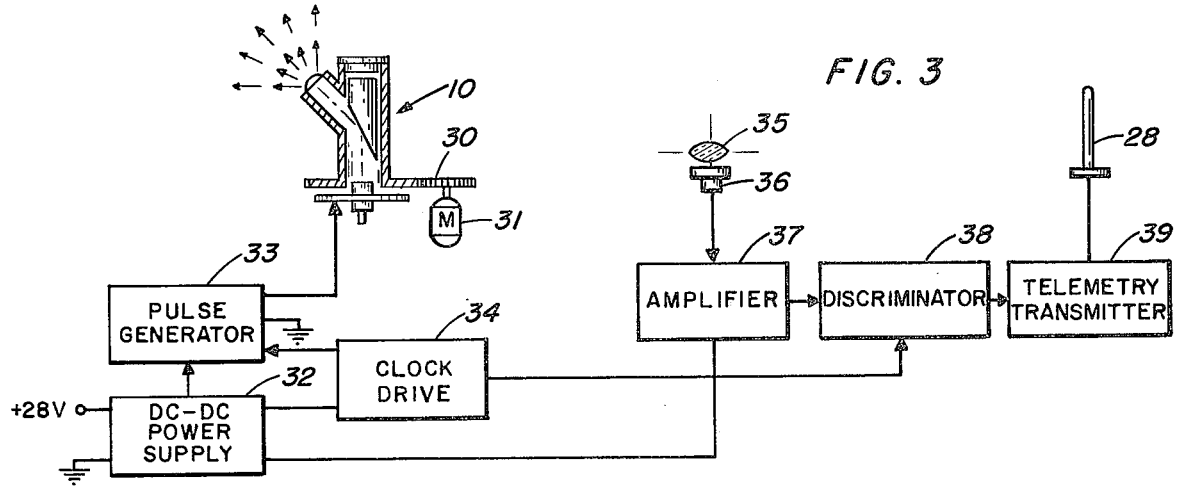
FIG. 3 shows in functional block diagram form circuitry for miss distance determination.

In FIG. 3, the scanning system 10 of FIG. 1 is shown as part of a complete MDI. The DC-DC power supply 32 is a standard power supply which converts the 28 volt source to sufficient voltage to drive the pulse generator. Normally, this is 300 to 600 volts depending on the peak laser power required. A standard DC-DC power supply which will satisfy a 200 watt laser radiator requirement is a model LC-210 produced by the Laser Diode Laboratories of Metuchen, N.J. Another unique system which also includes the pulse generator is a microminiature GAALAS laser diode pulser, Model LP2001, manufactured by Washington Technological Associates of Rockville, Md., which measures approximately ½ inch in diameter by 1 ¼ inches long. This diode pulser would permit both the DC-DC power supply and the pulse generator to be mounted in the laser head.

The pulse generator 33 receives a trigger pulse from the clock drive 34 and converts this to a driving pulse to cause the laser diode to emit a light pulse. The pulse power supply for a laser diode array must be capable of supplying a peak voltage sufficient to drive the increased diode load. When a capacitor-discharge type of pulse power supply is used, a high-voltage switch must be employed to accommodate the applied voltage to the charge capacitor. To obtain wide flat-topped pulses, it is also necessary to include a pulse-forming network between the high-voltage charge capacitor and the switch. Pulse generators meeting these requirements are known in the art.

The clock drive, or trigger circuit 34, serves two functions. It provides the pulse to trigger the switching device in the laser pulser at the desired repetition rate and it provides the desired pulse shape to minimize the time during which the current applied to the laser is used to heat the junction rather than to provide useful output. The ideal pulse waveform is a squre wave since it is the rise and fall time which cause the diode junction to heat. The Model LP 2001 laser diode pulser, produced by Washington Technological Associates, which was previously described, incorporates an internal clock drive which produces a repetition rate of 10 K Hz. This is a suitable choice for the MDI.

The clock drive, or timing circuit, performs one other function in addition to driving the pulse generator. The clock drive produces a reference pulse which is delivered to discriminator 38 simultaneously with the trigger of the laser diode. This reference pulse is utilized as the reference pulse against which the received pulse is matched to determine the miss distance.

The MDI functions in the following manner. The clock drive 34 transmits a trigger pulse to the pulse generator 33. Simultaneously with the release of the trigger pulse to the pulse generator, the clock drive transmits an identical square wave reference pulse to the discriminator 38. The reference pulse opens the gate to the detector. The pulse generator 33, at the same time, delivers the trigger pulse in an enhanced condition, having proper amperage and voltage, to the gallium arsenide laser diode in scanner 10 which pulses an identical square wave pulse of light energy. The scanner 10 is rotated by means of gear 30 turned by motor 31 and spreads the light energy in the hemispherically shaped envelope previously described. When a missile enters the radiation envelope, light energy is reflected from the surface. The reflected light energy, still in the square wave form, enters the receiver lens 35 of the MDI and is focused on the face of silicon PIN detector 36. The detector faithfully recreates the light wave as a square wave electrical pulse which is pre-amplified to increase the pulse gain. The electrical pulse is then passed to amplifier 37 where it is further amplified and transmitted to the discriminator 38.

the discriminator matches the received pulse to the reference pulse and if the pulses match, closes and re-arms the gate. In order to obtain the required range resolution, the discriminator may employ pulse height discrimination and leading edge - trailing edge averaging.

The time interval between the reference pulse and the received pulse defines the distance measurement. In order to permit the time function to be telemetered to a ground receiving station where the function can be properly utilized in a computer to resolve the miss distance, the time function can be translated into a coded frequency modulated signal. The discriminator gate circuitry can be designed such that the opening and closing of the gate results in a pulse width modulated (pwm) pulse in which the amount of pulse modulation equals the time interval between the reference laser pulse and the received laser pulse. The pwm pulse in turn controls a switching diode which acts as the keyer to shift the frequency of the transmitted oscillator in transmitter 39. The telemetry transmitter 39 is a conventional transmitter and transmits the signal to the ground receiving station via antenna 28. The ground receiver receives the frequency modulated signal and demodulates it to extract the pwm pulse. The pwm pulse is fed into the computer where the time function is extracted from the pulse. Since light energy travels at 1 foot per nanosecond, the separation distance in feet between the missile and the target is equal to one half the time function measured in nanoseconds. The computer electronically plots the distance measurements as they are received and fits a curve to the resulting points by the method of least squares. The resulting curve is differentiated to find the minima, i.e. where $dy/dx = 0$. The minimum point is the point of closest approach and the distance measurement at that point is the miss distance.

Figure 4:
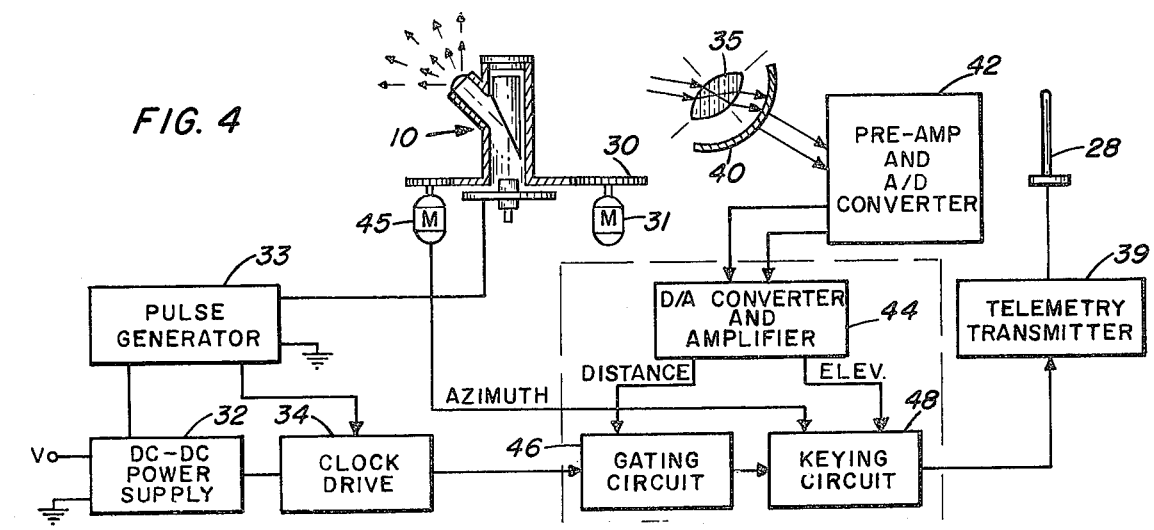
FIG. 4 shows in functional block diagram form circuitry for miss distance and missile vector determination.

FIG. 4 shows a modification of the embodiment of FIG. 3 which permits the extraction of missile vector information as well as miss distance.

The primary difference between the unit that provides miss distance scoring only and the unit that provides vector scoring as well is the design of the receiver. A silicon PIN spot detector is adequate for miss distance scoring only. In order to provide a capability for vector scoring, a position sensing detector is substituted for the spot detector.

In order to define the missile intercept vector, two vector components, the azimuth and the elevation, must be defined. The azimuth component of the vector solution can be obtained by electronically sensing the scanning mirror position at the time the mirror reflects the radiated pulse. This can be accomplished by attaching a synchro or transducer unit to the rotating optics.

One way in which the elevation can be determined with the rotating diagonal mirror scanning system is by measuring the dwell time of the radiated pulse on the missile. The dwell time of the energy pulse on the missile increases with elevation for the same distance radial. Therefore, the dwell time is directly related to the elevation.

The preferred method of obtaining the missile elevation information is by means of a position sensing silicon PIN strip detector. The position sensing strip detector is a sensitive silicon photodetector which gives an electrical output signal corresponding to the position of a light spot on the surface and another electrical signal corresponding to the intensity of the light spot. The position sensing strip detector is wired as a part of a balanced circuit with the null point being fixed by the geometry of the cell. The null point can be shifted electrically to provide the reference geometry desired. The device senses the centroid of the light spot and gives a continuous analog output from the null point to the limit of the active area. The position sensitivity is given as the current unbalanced created per milliwatt of incident power per 0.001 inch movement from the null point. Position accuracy is independent of incident power changes or light spot size since the device determines the centroid of the light signal.

The missile azimuth and elevation information thus obtained is transmitted to a computer along with the miss distance information.

Referring specifically to FIG. 4, power supply 32, clock drive 34, pulse generator 33, drive motor 31, gear 30 and the transmitting optics of scanner head 10 are the same as in the previously described embodiment. A synchro unit 45 is mechanically connected to the scanner head to provide azimuth information. A spherical lens 35 is utilized to focus the received light pulse on the detector 40. The detector, rather than being flat, is of a semi-circular shape with the lens at the center position. The LSC series single axis position sensing strip detector manufactured by United Detector Technology of Santa Monica, Calif., provides a position sensitivity of 0.2 $\mu$amps/milliwatt/mil. This means that if a 1 milliwatt incident spot is moved 0.001 inch, an electrical output of 0.2 $\mu$amps will be produced. If a 10,000 OHM load resistor, $R_1$, is used, a 2 millivolt output will be produced for a displacement from the null point of 0.001 inch. Since the rotating scanning system scans in a 360° pattern, the position sensing strip detector is mounted in the rotational head such that the sensing axis lies in the same plane as the light wedge. Thus, the position sensing detector senses the elevation relative to the rotational position of the radiated beam. This will be shown in more detail in FIG. 5. The position sensing signal which results when the light pulse strikes a point which is displaced from the null point of the detector is pre-amplified through several stages to increase the strength of the signal. Since the position sensing detector is mounted in the rotating head of the rotating diagonal mirror scanning system, the signal must be picked off the head by a brush-type pickoff unit. The signal produced by the detector is an analog signal which is extremely susceptible to distortion and noise introduced by the brush. As a result, the signal must be highly amplified and then converted from an analog signal to a digital signal prior to being fed to the pick-off unit. This is accomplished by passing the signal through several stages of amplification and then through an analog-to-digital converter integrated circuit 42. From there, the signal is fed through the pick-off unit to the discriminator as a digital signal. At the discriminator, the signal is passed through a digital-to-analog converter integrated circuit 44 to return the signal to its original analog state. The analog signal is further amplified after which it is fed to the keyer circuit 48 of the discriminator.

Since it is extremely important to avoid distortion of the signal from the detector, the wiper brush of the pick-up unit should be designed to reduce the tendency of the wiper to skip or chatter. In this respect, it is considered that the design of the type wiper used in computers for pick-up of data from magnetic drums is a good design selection.

Once the azimuth, elevation and distance information reaches the discriminator, the telemetry transmitter 39 is modulated in the conventional manner to transmit the information via antenna 28 to a ground station computer. A typical system for providing the modulating and transmitting function is the ASCOP TK-M7 telemetering set produced by Applied Science Corporation of Princeton, N.J. J.

Figure 5:
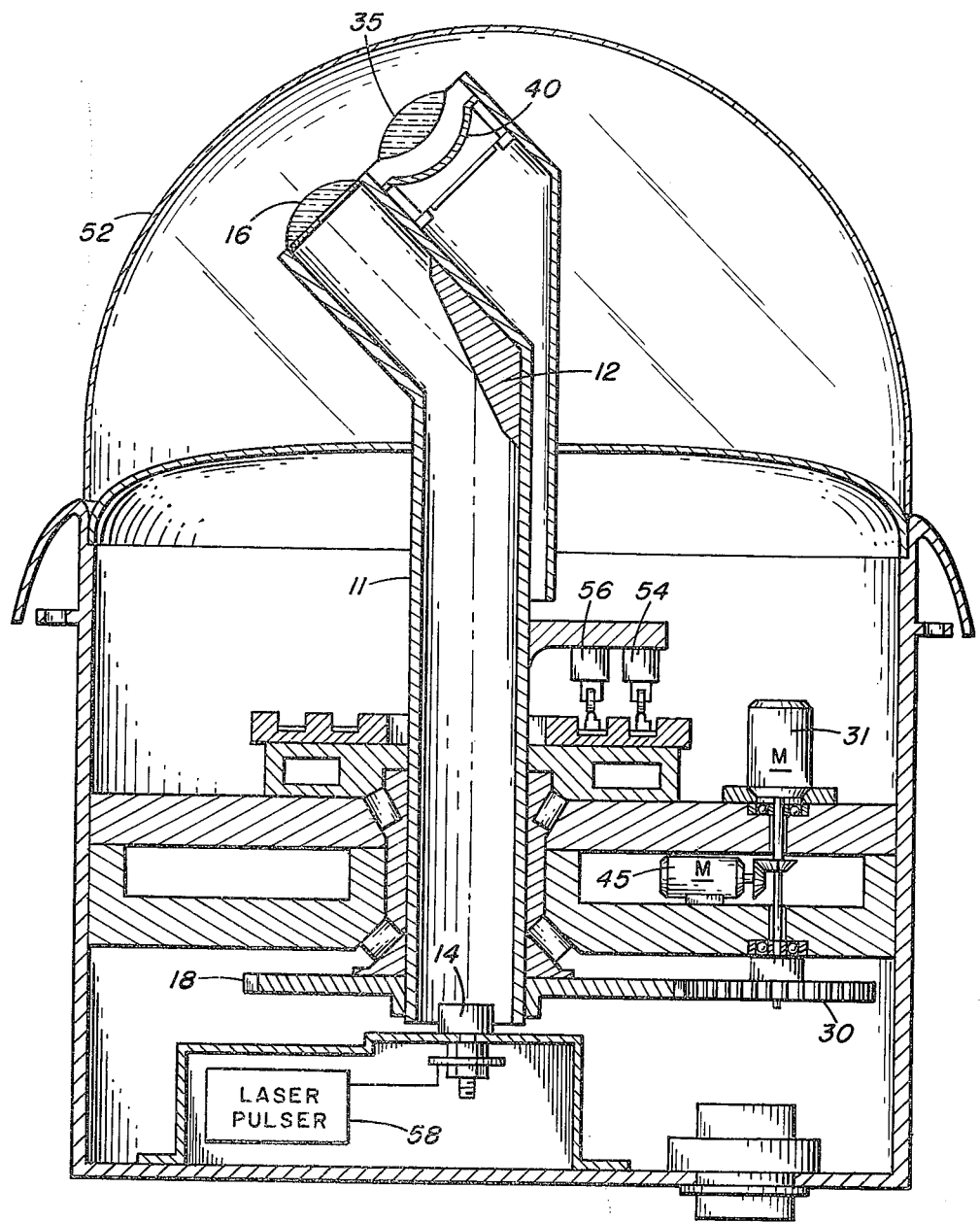
FIG. 5 shows an embodiment of the scanning system used in FIG. 4.

FIG. 5 shows an embodiment of the rotating diagonal mirror scanning system used in a vector scoring system. The laser diode 14, lens 16, mirror 12, tube 11 and gear 18 are the same as in the FIG. 1 embodiment. Position sensing strip detector 40 is mounted behind lens 35 in the head and rotates with the head. The detector is semicircular and is positioned so that an echo at 45° elevation will produce a light spot at the null point, which is the center of the strip. An echo at an elevation between 0° and 45° will produce a signal of one polarity; between 45° and 90°, a signal of opposite polarity is produced. The signals produced are picked off the rotating head by previously described brushes 54 and 56. Motor 31 rotates the head through the meshing of gears 30 and 18. Synchro 45 is shown connected to the shaft of motor 31 by means of gears. The laser pulser 58 may be the previously mentioned Model LP 2001. A clear dome cover 52 can be provided to protect the working parts from exposure to the elements.

Figure 6:
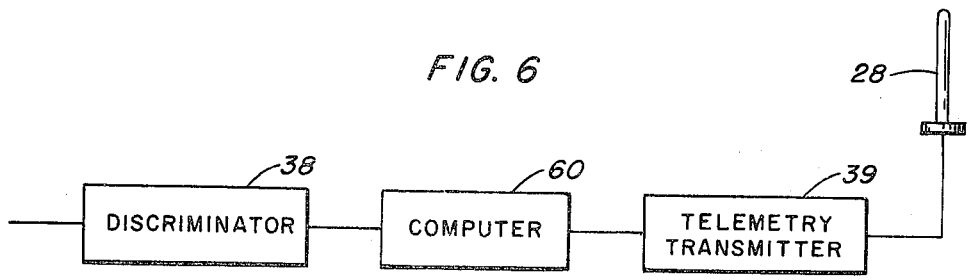
FIG. 6 shows a modification of the circuitry of FIGS. 3 and 4.

In the embodiments discussed so far, the target transmits the distance and vector points obtained from each echo individually to the ground station where a computer combines the points into a curve and calculates the miss distance and vector information. However, it ould simplify the telemetry electronics to have the computer on the target. As shown in FIG. 6, the computer 60 is connected between the discriminator 38 and telemetry transmitter 39. The computer receives the individual point data directly from the discriminator. The computer operates the same as if it were on the ground, calculating the miss distance and missile vector information. Only this information need be transmitted to the ground receiver. Thus there is only one telemetry transmission for each missile shot.

The present invention can be used in other environments. It is, for example, easily adaptable to use as a ground scoring MDI. Since the missile being scored will always impact on the ground, only azimuth and distance information is required to determine the miss distance. Since the impact point is one point in the missile trajectory equation, a reduced number of elevation readings are required to determine the missile trajectory. If the scoring unit is placed at the center of the bulls eye and scans the surrounding area by rotating the scanning head 360°, as in FIG. 1, the radiation pattern need only be spread vertically 45° in order to sample a sufficient height around the target area. The scanner is then scanning a 45° sperical section rather than a hemisphere. The scanning head could be positioned away from the center of the bulls eye and scan only a 90° sector. The scoring unit is positioned on a line perpendicular to the flight path line of normal approach of the missile and scans at 45° wedge on either side of the bulls eye.

If it is desired to cover a full 360° sphere around the airborne target, two of the units can be used on the target, each to cover a separate hemisphere. It would be necessary to use two separate scanning heads. However, it would be a design consideration as to whether two complete MDI units would be used or the two separate scanning heads share the electronics package.

Figure 7:
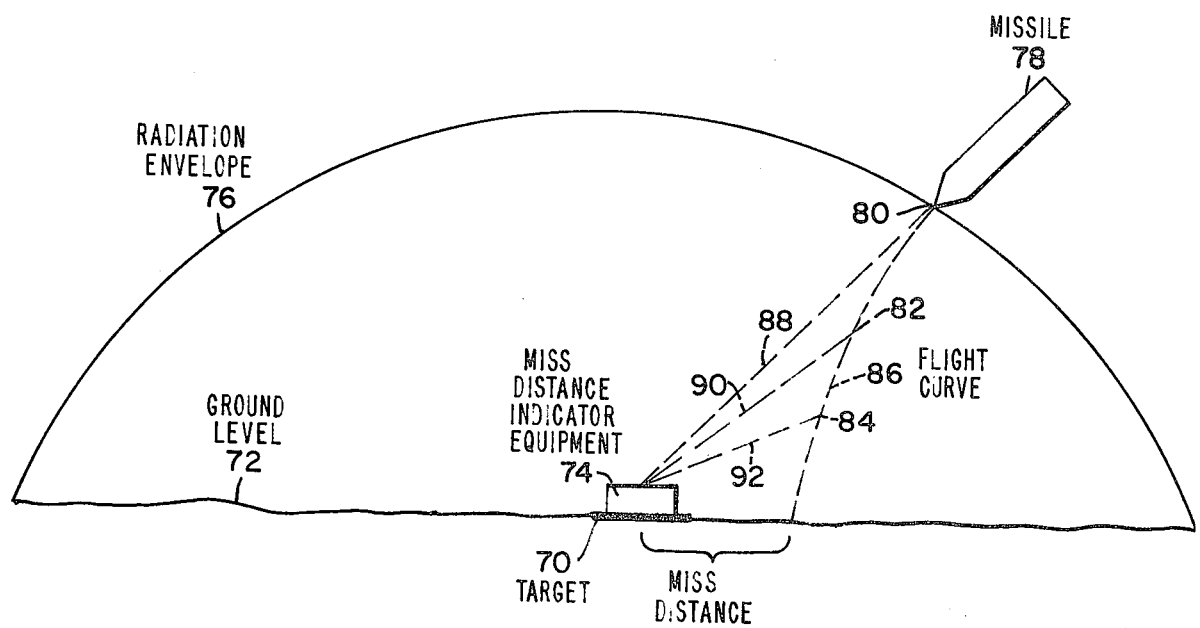
FIG. 7 shows schematically a missile entering the irradiated space.

FIG. 7 illustrates schematically the situation that exists around the target 70, for example, a bull's eye on the ground 72, although the target may be other things such as a drone aircraft. The miss distance indicator equipment 74 may be located on the bull's eye of the target 70. The MDI equipment 74 irradiates a volume of space 76, which is preferably a hemisphere if the missile 78 may arrive from any direction. Of course, it is obvious that the irradiated space may be merely a cone, for example, pointing in the arrival direction if the missiles come in from a known direction. For want of a better term, the irradiated volume of space has been termed an "envelope" herein; however, it is apparent from the previous descriptive material that it is actually a volume of sapce in which pulses from the mirror scanning system will strike any object that is present therein. Thus, as the missile 78 enters the envelope 76, a laser pulse traveling along path 88 will hit the missile at point 80 and be returned to the MDI equipment 74. Point 80 will be the first of the series of location points along the missile's flight curve, or path, 86.

Some time later, another pulse, traveling along another path 90, will hit the missile at point 82. This will constitute another location point on the flight curve. Then a third pulse will hit the missile at point 84 and this will provide another location point. Other pulse hits will follow, a minimum of five being desirable to provide increased accuracy, although only three are necessary to define the flight curve Obviously, many modifications and variations of the present invention are possible in light of the above teachings. It is, therefore, to be understood that, within the scope of the appended claims, the invention may be practiced otherwise than as specifically described.

I claim:

1. A non-cooperative miss distance indicator for measuring and indicating missile-to-target miss distance and missile vector data comprising:
   means for emitting a pulsed beam of monochromatic light;
   means for scanning the beam into the space adjacent the target to form a hemisphere of light about the target;
   means for receiving monochromatic light reflected from the missile and converting it into electrical signals corresponding to the distance, azimuth and elevation of the missile from the target; and
   means for receiving said electrical signals and computing therefrom the miss distance and missile vector data,
   the computing means first computing from said electrical data a series of location points for said missile, computing from at least three such points the flight curve of said missile, and computing from the flight curve the miss distance of said missile from said target.

2. A non-cooperative miss distance indicator for measuring and indicating missile-to-target miss distance comprising:
   a clock drive for generating trigger and reference pulses;
   means for emitting a beam of pulsed monochromatic light synchronized with said trigger pulses;
   means for scanning the beam into a hemispherically shaped envelope of radiation around the target;
   means for receiving monochromatic light pulses reflected from the missile and converting them into electrical pulses corresponding to the distance, azimuth and elevation of the missile from the target;
   means for comparing said electrical pulses to said reference pulses to generate distance points; and,
   means for receiving a plurality of distance points and computing the miss distance therefrom.

3. The miss distance indicator of claim 2 wherein said light emitting means includes a laser diode.

4. The miss distance indicator of claim 2 wherein said scanning means comprises:
   a housing, said laser diode being mounted within the housing;
   a plane mirror mounted within the housing in the path of the light beam at an angle thereto;
   optical means for spreading the beam of light into the shape of a fan; and,
   means for rotating said housing to produce the hemispherically shaped envelope of radiation.

5. A non-cooperative miss distance indicator for measuring and indicating missile-to-target miss distance and missile vector data comprising:
   a clock drive for generating trigger and reference pulses;
   means for emitting a beam of pulsed monochromatic light synchronized with said trigger pulses;
   means for scanning the beam into an envelope of radiation adjacent the target;
   means for generating a signal representative of the azimuth angle of said scanning means;
   means for receiving monochromatic light pulses reflected from the missile and converting them into electrical pulses representative of the elevation angle of said missile;
   means for comparing said electrical pulses to said reference pulses to generate distance points; and,
   means for receiving a plurality of distance points, azimuth angle signals and electrical pulses, and computing the miss distance and missile vector information therefrom.

6. The miss distance indicator of claim 5 wherein said receiving means comprises a position sensing strip detector.

7. The miss distance indicator of claim 6 wherein said scanning means comprises:
   a housing, said light beam emitting means being mounted within the housing;
   a plane mirror mounted within the housing in the path of the light beam at an angle thereto;
   optical means for spreading the beam of light in the shape of a fan; and,
   means for rotating said housing to produce the hemispherically shaped envelope of radiation.

8. The miss distance indicator of claim 7 wherein said position sensing strip detector is mounted in the housing.

9. The miss distance indicator of claim 8 further comprising:
   an analog-to-digital converter connected to the position sensing strip detector for converting said electrical pulses to digital signals;
   brush means for taking said digital signals off said rotating housing; and,
   a digital-to-analog converter connected to the brushes for converting the digital signals to analog signals.

10. A non-cooperative miss distance indicator for measuring and indicating missile-to-target miss distance and missile vector data comprising:
    means for emitting a pulsed beam of monochromatic light;
    means for scanning the beam into the space adjacent the target to form a volume of space which is irradiated by said pulsed beam of light;
    means for receiving monochromatic light reflected from the missile and converting it into electrical signals corresponding to the distance, azimuth and elevation of the missile from the target; and
    means for receiving a plurality of said electrical signals and computing therefrom the miss distance and missile vector data,
    the computing means first computing from said electrical data a series of location points for said missile, computing from at least three such points the flight curve of said missile, and computing from the flight curve the miss distance of said missile from said target.

* * * * *